Oct. 20, 1953 A. H. BALLARD ET AL 2,656,278
ZIRCONIA AND METHOD OF QENCHING SAME
AND ARTICLES MADE THEREFROM
Filed March 16, 1950 3 Sheets-Sheet 1
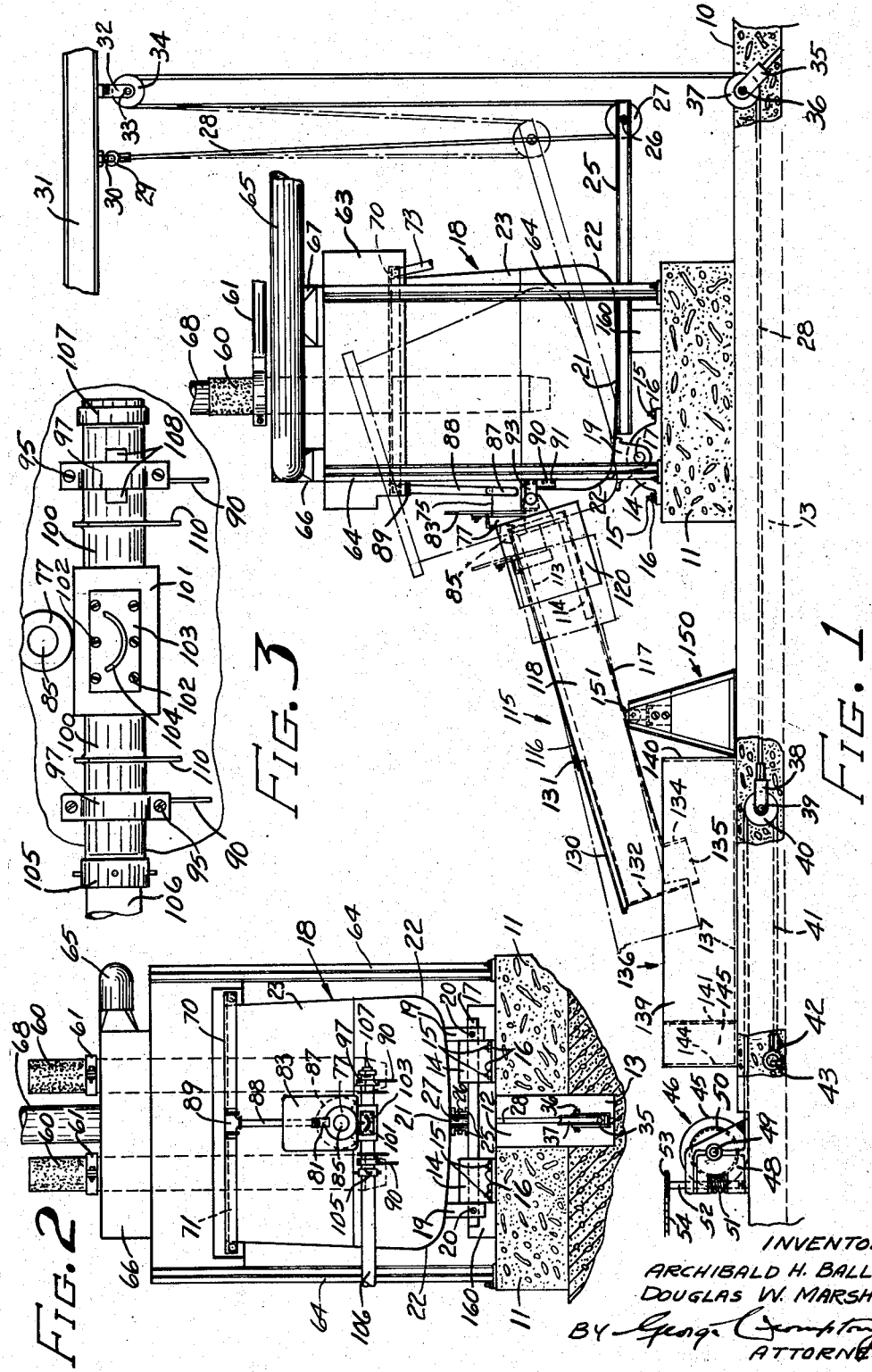
INVENTORS
ARCHIBALD H. BALLARD
DOUGLAS W. MARSHALL
BY George Crompton
ATTORNEY

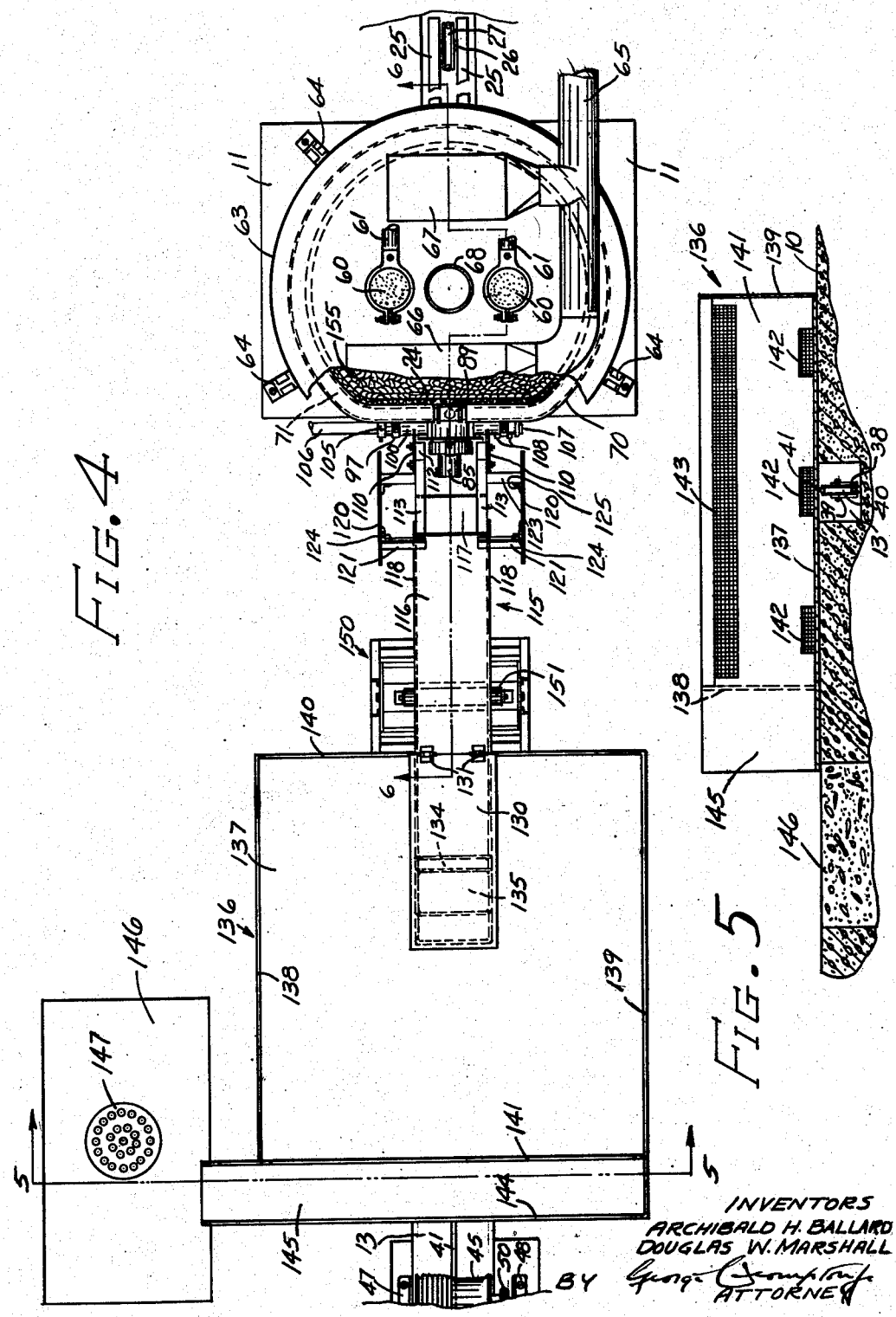

Oct. 20, 1953
A. H. BALLARD ET AL
2,656,278
ZIRCONIA AND METHOD OF QENCHING SAME
AND ARTICLES MADE THEREFROM
Filed March 16, 1950
3 Sheets-Sheet 3
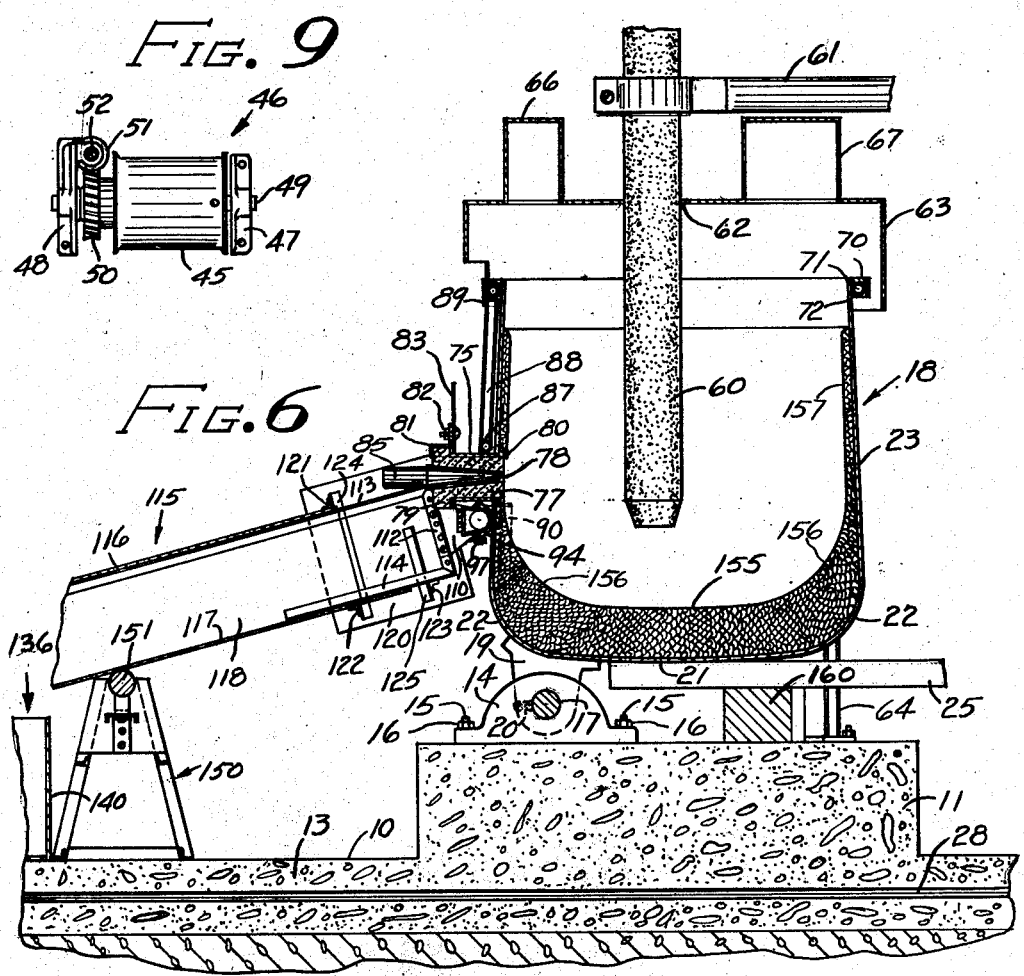
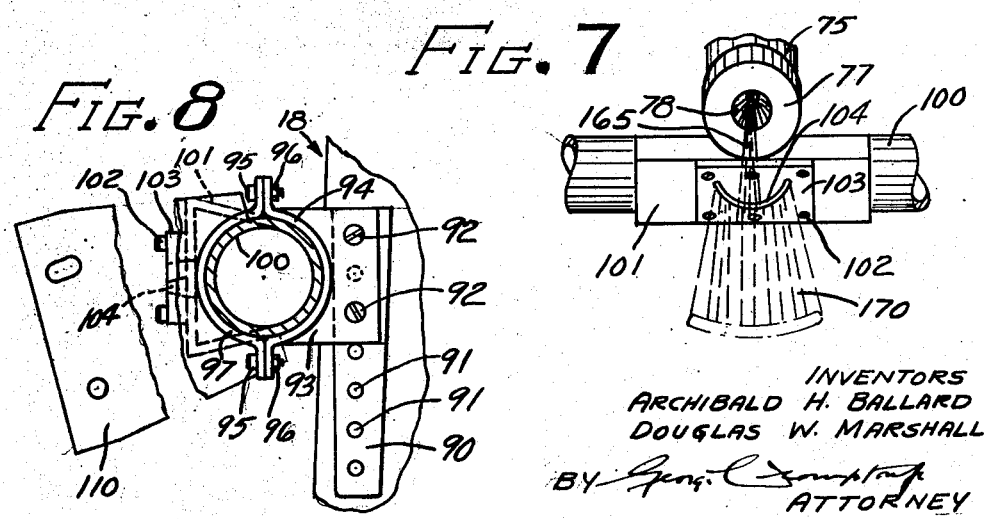
INVENTORS
ARCHIBALD H. BALLARD
DOUGLAS W. MARSHALL
BY *George C. _____*
ATTORNEY Patented Oct. 20, 1953

2,656,278

UNITED STATES PATENT OFFICE 2,656,278

ZIRCONIA AND METHOD OF QUENCHING SAME AND ARTICLES MADE THEREFROM

Archibald H. Ballard and Douglas W. Marshall, Niagara Falls, Ontario, Canada, assignors to Norton Company, Worcester, Mass., a corporation of Massachusetts Application March 16, 1950, Serial No. 150,096

6 Claims. (Cl. 106—57)

The invention relates to zirconia, a method of quenching it and articles made therefrom. This application is a continuation in part of our copending application Serial No. 90,456, filed April 29, 1949, now abandoned.

One object of the invention is to provide a superior material for thermally insulating the heating coils of induction heating apparatus. Another object of the invention is to provide a simple, inexpensive and reliable method for the production of light weight articles of zirconia. Another object is to produce a stable zirconium oxide refractory material of low specific gravity in bulk form for the production of many different kinds of refractory articles having low specific gravity.

Another object of the invention is to produce a stabilized zirconia having a low specific gravity in bulk form. Another object of the invention is to produce light weight refractories which are extremely refractory and at the same time good heat insulators.

Another object of the invention is to provide a method for the manufacture of zirconia in comminuted form without the necessity of any crushing operation. Another object of the invention is to make zirconia particles in the form of hollow shells of revolution. Another object of the invention is to provide a method for the fusion and reduction of zirconia containing ores and the quenching of the molten reduced material for the production of fine particles suitable for the manufacture of bricks and other shapes which fine particles have large air spaces therein whereby to make bricks and other shapes of very low specific gravity and high thermal resistance. Another object of the invention is to make zirconia grain in the form of hollow spheres or hollow oblate spheroids by a simple process. Another object of the invention is to make zirconia articles having one or more of the characteristics above indicated which are also resistant to thermal shock and will not readily spall. Another object is to make refractory material which is also relatively inert at high temperatures.

Other objects will be in part obvious or in part pointed out hereinafter.

In the accompanying drawings illustrating one of many possible embodiments of an electric furnace which can be used to carry out a step in the method of the invention, Figure 1 is a side elevation of a tilting furnace, quenching trough and receiver, Figure 2 is a front elevation of the furnace, Figure 3 is a front elevation on an enlarged scale of the conduits and nozzle for producing the hydraulic stream, Figure 4 is a plan view of the furnace, the quenching trough and the receiver with part of the hood over the furnace broken away the better to show the parts below, Figure 5 is a vertical sectional view taken on the line 5—5 of Figure 4 showing the grain receiver, Figure 6 is a vertical sectional view of the furnace and the quenching trough, Figure 7 is a fragmentary view illustrating the quenching of the hot liquid material, Figure 8 is a fragmentary side elevation on an enlarged scale showing the articulation of the quenching trough to the furnace, Figure 9 is a plan view of a winch.

We prepare a furnace mixture of zirconia ore, coke, iron borings, and as a stabilizing agent we use calcium oxide, lime, CaO.

Various zirconia ores or partially purified zirconia powders can be used and the invention is not limited to any particular one; in fact a particular object of the invention is to provide a satisfactory method for making a relatively pure zirconium oxide product out of readily available and inexpensive ores. These are mainly the zircon ores and the zirkite ores. Analyses of these ores are usually within the following range:

TABLE I

| | Percent |
|---|---|
| $ZrO_2$ | 65 to 95 |
| $SiO_2$ | 3 to 35 |
| $Fe_2O_3$ | 0.1 to 6 |
| $TiO_2$ | 0.1 to 2 |

The quantity of carbon provided in the furnace mixture should be two-thirds of the theoretical quantity of carbon required completely to reduce the silica plus 100% of the theoretical quantity required to reduce all the other oxides (except zirconia) to metal plus about 20% excess over all of these quantities. This quantity can be varied from the above with no excess to the above with 40% excess. The reason why we provide only two-thirds of the theoretical quantity of carbon required completely to reduce the silica is that we have found that about one-third of the silica is volatilized during the furnacing operation. On the other hand the excess mentioned is provided because some of the coke is used up by combining with oxygen other than that provided by the oxides to be reduced.

A particular zirconia ore yielded an analysis as follows:

TABLE II

| | Parts |
|---|---|
| Ignition loss | 1.17 |
| $ZrO_2$ | 74.35 |
| $SiO_2$ | 18.25 |
| $Fe_2O_3$ | 3.19 |
| $TiO_2$ | 1.50 |
| Total | 98.46 |

Other typical ores which have been used were found to yield analyses as follows:

TABLE III

|  | Baddeleyite Favas Type | Zirkite | Zircon |
|---|---|---|---|
|  | Percent | Percent | Percent |
| $ZrO_2$ | 81.60 | .70–79 | 65–67 |
| $SiO_2$ | 6.27 | 12–18 | 30–34 |
| $Fe_2O_3$ | 5.54 | 3–6 | 0.1–0.5 |
| $TiO_2$ | 1.00 | 1–2 | 0.1–1.0 |

Making the stoichiometric calculations and using the above rule of two-thirds and the above rule of 20% excess the amout of carbon required according to our formula for the ore of Table II would be about 6.7% of the weight of the ore. The exact quantity of coke required would depend on the amount of fixed carbon in the particular coke being used.

The quantity of iron, in the form of borings or otherwise, should be enough to form with the silicon that is reduced from silica a ferro-silicon having an iron content of from 75% to 85%. It will be remembered that about one-third of the silica volatilizes so the amount of silicon produced is two-thirds of that present in the silica content of the ore. The purpose of the iron is to combine with the silicon to form a ferro-silicon alloy which has a much higher specific gravity than elementary silicon and therefore will go to the bottom of the furnace and, after solidification, form a ferro-silicon button containing also other reduction products that can readily be separated from the rest of the ingot. If there were no iron in the mix the silicon would be present as such and having a lower specific gravity not all of it would go into the button. In making the above calculation as to the quantity of iron to use, the free iron produced by reduction of the iron oxide should be taken into account so that the 75% to 85% is the total iron, both that which will be produced by reduction of the oxide and that which should be added in the form of borings or otherwise. Therefore the amount of iron to add is enough to make with two-thirds of the silicon present in the ore a ferro-silicon having an iron content of from 75% to 85% minus the amount of iron obtained by the reduction of the iron oxide in the ore to iron and this of course must take into account that, as hereinafter shown, a small percentage of iron oxide remains in the final product.

The quantity of lime as a stabilizing agent to be added should be from 3% to 6% of the amount of $ZrO_2$ in the ore.

The reason for providing the stabilizing agent in the above percentages is that less will not satisfactorily stabilize the zirconia, and more will form a eutectic thus making the product less refractory. The stabilizing agent in the range given causes the zirconia to crystallize predominantly in the cubic system but when less of the stabilizing agent is used the crystals are predominantly monoclinic. Ordinary or natural baddeleyite is monoclinic whereas the product of this invention is predominantly cubic. The monoclinic form of zirconia when made into refractory articles such as bricks and other shapes spalls, checks, crazes or fractures when used in high temperature furnaces. On the other hand, the product of this invention, a zirconia of predominantly cubic crystal form, withstands heat shock for many cycles. When the lime is as much as 6% the crystals are nearly all cubic and when the lime is as low as 2.7% about 35% of the crystals are cubic. The following table shows the content of cubic crystals in various lots of fused zirconia containing different percentages of lime.

TABLE IV

| Percentage Content of Lime, CaO | Percentage Content of Cubic Crystals |
|---|---|
| 2.70 | 35 |
| 4.54 | 95 |
| 4.70 | 85 |
| 4.74 | 85 |
| 4.75 | 80 |
| 4.88 | 100 |
| 5.04 | 100 |

We believe that the failure of the percentage of cubic crystals to reflect increases and decreases in lime content in all cases was due to variations in reduction of silica in the several furnacing operations. Unless the silica is fully reduced some or all of the unreduced silica will combine with some of the lime to form a separate phase of calcium silicate thus making less lime available to stabilize the zirconia and to form cubic crystals. When enough carbon is provided to reduce all but about 0.5% of the silica, however, 3% of lime will yield at least 50% of cubic crystals and, if the small residue of unreduced silica is kept constant in a series of furnacing operations, the percentage content of cubic crystals will increase for every increase in the total lime content until the product is 100% cubic, so therefore it can be said that the cubic crystal content of the product is a function of the lime content of the furnace charge if other things are equal, or that the cubic crystal content is a function of the lime available for stabilization. The product according to this invention is predominantly cubic meaning that at least a little bit more than 50% of the crystals are cubic. This result is attainable within the limits of 3% to 6% of lime on the amount of $ZrO_2$ in the ore in the furnace mixture.

When this fused material is crushed and roasted and made into bricks, plates or other shapes for commercial use, it is found that desirable characteristics are achieved when better than 50% of all the crystals are cubic. Such a product which is but little more than 50% cubic has utility particularly in the field of application where heat-shock requirements are severe. For example, when rectangular plates about 4″ square by ¼″ thick are made according to the invention with 55% to 85% cubic crystals and used as a support for special ceramic ware being fired in a tunnel kiln operating at 1260° C., the plates can be put through the kiln many times without fracture from heat shock or otherwise, even though the mechanical strength of the plates as a whole may not be as great as when a fused product containing a larger amount of cubic zirconia is employed.

For extremely high temperatures of application where maximum strength is desired in the product it may be desirable to employ stabilized zirconia fusions in which the amount of cubic zirconia is 75% to 90% or even more. A high content of cubic zirconia is considered to be advantageous for extremely high temperature applications where resistance to severe heat shock is not the most important factor.

To explain these particular results it is theorized that, although products made from fusions consisting of 100% cubic zirconia have a continuously uniform coefficient of expansion, thus avoiding completely the abnormal and eccentric expansion behavior of monoclinic zirconia, which passes through a phase change or inversion, nevertheless this expansivity of the cubic zirconia alone is somewhat higher than that of mixtures containing some of the monoclinic zirconia. The question seems to be one of avoiding a predominance of the fused monoclinic zirconia in the product because its disruptive expansion characteristic then becomes a controlling factor and causes the product to fail by cracking, and also, when maximum resistance to heat shock is desired, avoiding having 100% of the cubic zirconia since a small amount of the monoclinic zirconia tends to lower the average expansivity characteristics of the product as a whole.

As a guide to carrying out the invention in practice but not as a limitation thereto we will give a clear description of the mechanical steps in carrying out the furnace operation. A regular alumina electric arc furnace can be used, this type of furnace being of a size to produce, in the case of alumina, an ingot of about eleven tons. This is a common type of electric arc furnace. About two feet of mixture is placed on the carbon bottom of the furnace and then bridges of coarse coke are placed immediately under the electrodes to form a path from each electrode to each other electrode when they are lowered into the furnace in contact with the coke, these furnaces usually having three electrodes because they usually use three phase electric power although two electrode furnaces operating on single phase power can be used. The electrodes are lowered until they make contact with the coke bridges and current will flow across these bridges until sufficient of the mixture has melted to carry the power load. Furnace mixture is then added from time to time so as to keep only a thin layer of unmelted mixture on top of the gradually enlarging pool or bath of molten material until finally the electric furnace is full of molten material. Then the electrodes are removed and the furnace contents allowed to cool. When the ingot has solidified sufficiently so that there is no danger of molten material flowing from it through a crack or otherwise, the furnace shell is lifted from the pig and then after further cooling the pig is broken up by means of sledge hammers or skull crackers. The metallic button consisting mostly of ferro-silicon but with some titanium or other reduced products is found on the bottom of the ingot and this is removed for sale as a by-product or other use. The remainder of the product will be found to analyze about as follows:

TABLE V

| | Percent |
|---|---|
| $ZrO_2+CaO$ | 97 to 99+ |
| $SiO_2$ | 0.14 to 0.70 |
| $Fe_2O_3$ | 0.20 to 0.70 |
| $TiO_2$ | 0.30 to 1.00 |

The broken material is hand sorted to remove remnants of unfused material and of ferro-silicon and then the good material is crushed to grit, preferably to grit sizes No. 4 and finer, then magnetically separated to remove any metal which may have been introduced during crushing or metal which was not removed during sorting. The foregoing description of a furnacing operation and the reduction of zirconia containing ore to reduce as much as possible of the silica and other oxides and the addition of lime to the furnace charge is substantially the same as that described in our copending application Serial No. 139,532, filed January 19, 1950, and now U. S. Patent No. 2,535,526, patented December 26, 1950.

The stabilized zirconium oxide made as above described is the starting material for a second furnacing operation using a tilting furnace which will shortly be described. However, so far as certain features of the invention are concerned, the starting material for the tilting furnace might be any kind of fairly pure zirconia, either stabilized or unstabilized, for the stabilizing by the addition of lime can quite practically be done by adding zirconia and lime in the proportions hereinbefore indicated to the tilting furnace and fusing the material therein. Furthermore, for the production of particles for use as loose refractory material, the lime need not be added at all at any stage, since low specific gravity unstabilized zirconia in grain form is quite useful. So therefore baddeleyite, zirkite or zircon with or without lime can be placed in the tilting furnace, the proportions of lime if added as previously stated being from 3% to 6% CaO of the amount of $ZrO_2$. However, in accordance with our present methods for making the material of this invention we do not expect to do a great deal of purification by reduction of other oxides especially of silica in the tilting furnace because it is desired to run the tilting furnace almost continuously, that is for days and days and weeks and weeks and sometimes even months and months, and therefore we do not want to have in the tilting furnace anything which will form a ferro-silicon pool at the bottom thereof because in this particular illustrative embodiment we have provided no satisfactory way for getting rid of the ferro-silicon. However, it is nevertheless within the scope of our invention to use other kinds of tilting furnaces, for example which can be tilted to a position to pour off the ferro silicon from time to time and in that event the purification by reduction, the addition of lime to stabilize, and the melting to pour for quenching could all be done in a single furnacing operation. Nevertheless to continue with the description of this invention as we have carried out in practice and as appears to be most satisfactory at the present time, we will now describe the particular tilting furnace which we have successfully used.

Referring now to Figures 1 and 2, the furnace floor 10 is preferably made of concrete and has thereon a heavy concrete base 11, 11 in two parts. In line with the opening 12 between the base parts 11, 11 is a trough 13 in the floor 10.

Secured to each part 11 is a massive iron bracket 14 as by means of bolts 15 imbedded in the concrete and nuts 16 thereon. Extending horizontally through both of the brackets 14 is a rock shaft 17. A furnace shell 18 has a pair of heavy iron lugs 19 welded thereto and depending therefrom and the rock shaft 17 passes through these lugs 19. The lugs 19 are preferably secured to the rock shaft 17 as by means of screws 20.

Referring now to Figures 4 and 6, the furnace shell 18 is a bucket with a more or less flat bottom 21 which, however, merges at a rounded bottom periphery 22 with a wall 23 which is frustoconical with the large end down modified by a chordal plane portion 24.

The furnace is a tilting furnace, that is to say the shell 18 can be tilted, and for holding the shell 18 in its normal position where the frustoconical axis is vertical and also for tilting the furnace there is secured as by welding to the bottom 21 a pair of channel irons 25, 25. Comparing now Figures 1 and 4, extending through and between the channel irons 25 is a shaft 26 upon which is mounted a pulley 27. A cable 28 is secured by an eye 29 on the end thereof to a hook 30 secured to an overhead structure 31 such as an I beam. Also secured to the overhead structure 31 is a fork 32 supporting the axle 33 of a pulley 34. Secured to the floor 10 in the trough 13 is a fork 35 supporting the axle 36 of a pulley 37. The cable 28 extends from the eye 29, around the pulley 27, around the pulley 34, around the pulley 37 to a fork 38 to which it is secured. Extending through the fork 38 is the axle 39 of a pulley 40. Around this pulley 40 extends a cable 41 which is anchored by means of an eye 42 secured to the cable 41 and a hook 43 imbedded in the concrete floor 10 in the trough 13. This cable 41 extends to the drum 45 of a winch 46 which is shown in Figure 9.

The winch 46 may comprise a pair of standards 47, 48 secured to the concrete floor 10, which standards 47 and 48 journal a shaft 49 upon which is secured the drum 45, there being a worm wheel 50 also secured to the shaft 49. Meshing with the worm wheel 50 is a worm 51 on a shaft 52 which is shown cut off in Figure 9 in order that the other parts may more clearly appear. Referring back to Figure 1, mounted on the shaft 52 which is jornalled in bearings in the standard 48 is a sprocket gear 53 operated by a sprocket chain 54 which extends a long distance away from the furnace and may be operated by any suitable means either by hand or by power. The operator, who can be well protected by a concrete wall or an iron shield or the like, is able at any time to tilt the furnace or replace it in level position by means of the chain 54 which of course can be supported to prevent it from sagging.

Referring now to Figures 1 and 2, the furnace is energized by electric energy conducted to the ore to be fused by means of electrodes, for example in his instance a pair of graphite electrodes 60, 60. These are held by jibs 61, 61 which in turn are secured to masts (not shown) equipped with the usual automatic devices which raise and lower the electrodes in response to variations in the flow of electricity. Such apparatus forms no part of our invention and need not be described herein.

Referring now to Figures 1, 2, 4, and 6, the electrodes 60, 60 extend through openings 62 in the top of a hood 63 which may be shaped as shown and supported by four metal standards 64 resting on and bolted to the base parts 11 and suitably secured as by welding to the hood 63. The hood 63 collects fumes and gases which are drawn away from the furnace by suction apparatus connected to the hood 63 by a large pipe 65 opening into domes 66 and 67 welded to and communicating with the inside of the hood 63. Referring to Figures 2 and 4, a charging pipe 68 leads from over head into the top of the hood 63 for charging the furnace.

Referring now to Figures 1, 2, 4 and 6, at the top of the wall 23 is integrally secured as by welding to the furnace shell 18 a curved angle iron 70 forming a protective enclosure which is nevertheless open on the bottom for a pipe 71 which is secured in any suitable manner to the angle iron 70. This pipe 71 has fine holes 72 one of which can be seen in Figure 6 directing water to the top of the wall 23. These holes 72 are everywhere along the pipe 71 which is connected at one end to a pipe 73 connected to a hose (not shown) leading from a water supply; the other end of the pipe 71 is plugged. By means of the foregoing instrumentalities, a regular cascade of water pours down the outside of the furnace shell 18 at all times that the furnace is in operation. This is a known manner of keeping the shell 18 from melting. The water follows the metal even to the bottom 21 to cool substantially all parts of the shell 18.

Referring now to Figure 6, a short but large diameter heavy pipe 75 is welded to an opening in the chordal plane portion 24 so that the pipe 75 opens to the interior of the shell 18 but it is sealed all around to the shell 18. In this pipe 75 is a pouring spout 77 made of graphite and having a frusto-conical bore 78 and a lip 79, being otherwise cylindrical as shown and fitting snugly in the pipe 75. To secure the pouring spout 77 in position, there may be provided a clamp 80 overlying the inner end of the spout 77 and welded to the inside of the furnace shell 18 and another clamp 81 likewise overlying the end of the spout 77 and secured as by a nut and bolt 82 to a shield plate 83 which extends around and is welded to the pipe 75. A removable conical graphite plug 85 normally plugs the bore 78 of the pouring spout 77 but can be removed at any time desired as by means of a long pair of tongs manually operated. For cooling the heavy pipe 75 a horseshoe shaped pipe 87 extends, as shown in Figure 2, most of the way around the pipe 75 and this horseshoe shaped pipe 87 is connected by a pipe 88 to a union 89 in the pipe 71. The horseshoe shaped pipe 87 has many holes for discharging water upon the heavy pipe 75.

Referring now to Figures 1, 2, 3, 4, 6 and 8, welded to the outside of the wall 23 are vertical plates 90 with holes 91. Secured to these plates 90 by screws and nuts 92 extending through some of the holes 91 are a pair of brackets 93 with half clamps 94. Secured to the half clamps 94 by bolts 95 and nuts 96 are another pair of half clamps 97. Between the half clamps 94 and 97 are a pair of horizontal pipes 100 integral with a nozzle chamber 101 to which is removably secured as by means of screws 102 a nozzle plate 103 having an orifice 104 in the shape of a segment of a circle as shown in Figure 3. One of the pipes 100 is connected by a pipe connection 105 to a heavy hose 106 and the other pipe 100 is closed by a cap 107. The half clamps 94 and 97 hold the pipes 100 in position relative to the shell 18 but not so rigidly as to prevent the pipes 100 turning in the clamps. To prevent endwise movement of the pipes 100 relative to the shell 18 lugs 108 are desirably welded to one pipe 100 on either side of a half clamp 97.

Referring now to Figures 4, 6 and 8, welded to the pipes 100 just inside of the clamps 94, 97 and outside of the nozzle chamber 101 are a pair of vertical plates 110 which are bolted to a pair of short angle irons 112 each one of which is welded to a long upper angle iron 113 and a shorter lower angle iron 114. The angle irons 113 and 114 are parallel to each other and are perpendicular to the angle irons 112. The pair of angle irons 113 together with the pair of angle irons 114 form part of the frame of a rectangular parallelepipedal quenching trough 115 which has a fixed top plate 116 secured to the angle irons 113, a fixed bottom plate 117 secured to the angle irons 114 and a pair of side plates 118 each one of which is secured to one angle iron 113 and one angle iron 114. Vertical shield plates 120 are secured by a pair of angle iron struts 121 to the top plate 116 and by angle iron struts 122 to the bottom plate 117 and by angle iron struts 123 to the bottom angle irons 114 and these plates 120 may be reinforced by angle irons 124 perpendicular to and extending between the angle irons 122 and 122 and further by angle irons 125 extending upwardly from the junction of the angle iron struts 123 with the plates 120, all of these parts being welded together.

The quenching trough 115 may have additionally a movable cover 130 secured by means of a hinge 131 to the top plate 116, the cover 130 extending to an end wall 132 which extends downwardly preferably below the bottom of the bottom plate 117; the side plates 118 preferably also extend downwardly an equal distance and an inner depending wall 134 with the extensions of the side plates 118 and of the end wall 132 forms a discharging spout 135 of the pouring trough 115 to discharge water and quenched zirconia into a large receiver 136 which is an open top box, preferably made of steel plate and which may be rectangular, as shown. The receiver 136 has a bottom plate 137 resting on the floor 10, a pair of side walls 138 and 139 extending upwardly from the margins of this bottom plate 137, a back wall 140 extending upwardly from the bottom plate 137 and also extending between the side walls 138 and a baffle plate 141 having screened openings 142 at a lower level and screened openings 143 at an upper level.

The side wall 139 extends beyond the side wall 138 and forms with the baffle plate 141 and a front wall 144 and the bottom plate 137 to which they are attached, a water discharging trough 145 for discharging water into a collecting basin 146 in the bottom of which is a perforated cover 147 on the top of a discharging pipe, not shown, leading, for example, to the river from which the water was pumped. During a pouring operation both water and zirconia, at first liquid and then solid, move down the quenching trough 115 and are discharged out of the spout 135 into the receiver 136. The quenched zirconia is collected by the receiver 136 while the water flows through the screened openings 142 and 143 into the trough 145 and so to the basin 146 and down the pipe to the river or other place of discharge.

It will be seen that the quenching trough 115 is articulated to the furnace shell 18 and it is further more suported by an iron "saw horse" shaped structure 150 made out of a lot of pieces of angle iron, channel iron and the like which, since the shape and purpose thereof is readily apparent need not be described, part by part. This "saw horse" 150 rests on the floor 10 and has journalled on the top thereof a roller 151 upon which the quenching trough 115 rests; when the shell 18 is tilted forward the trough 115 moves somewhat forward but is at all times connected to the shell 18 and the spout 135 never moves outside of the area of the receiver 136.

Referring now to Figure 6, the furnace shell 18 has a bottom lining 155 of zirconia and this may be produced in the following manner: lump zirconia grog consisting of fused zirconia pieces which may be about a quarter of an inch in size mixed with some very fine particles (the pieces and/or the particles can be stabilized or unstabilized, quenched or unquenched zirconia) is placed in the bottom of the furnace shell 18 first to a level of several inches, then some coke is placed on top of the grog to form a path for the current and then the electrodes 60 are lowered into the furnace and the grog is melted. Later more grog is added and also fused with the electrodes 60 until the lining is built up to about the level indicated. To form the curved lining portions 156 the grog is banked and the furnace is tilted. Eventually during the furnacing operation this lining gradually extends itself to form a wall lining 157 as zirconia freezes upon the inside of the shell 18. During formation of this lining 157 the clamp 80 may melt but this does no harm since the lining takes its place.

To start a furnace operation the shell 18 is first leveled and this may be done by slacking off the winch 46 since a removable stop block 160 under the channel irons 25 determines the upright position of the shell 18. About two feet of zirconia produced as hereinbefore explained is placed on the bottom of the lining 155 and then a bridge of coarse coke is placed immediately under the electrodes 60 to form a path between the electrodes when they are lowered into the furnace in contact with the coke. The electrodes are now lowered until they make contact with the coke bridge and current will flow across this bridge until sufficient of the zirconia has melted to carry the power load. Furnace material is then added from time to time so as to keep only a thin layer of unmelted material on top of the gradually enlarging pool or bath of molten material until finally the level of the melt has risen so high that when the shell 18 is tilted, one side of the pool will come almost to the top of the lining 155.

The furnace is now ready for pouring. Preferably first water is caused to flow into the heavy hose 106 to cause water to emerge from the orifice 104 because no molten zirconia should be allowed to emerge from the pouring spout 77 until there is a stream of water to receive it. Now, before tilting the furnace, the operator removes the plug 85 but no zirconia flows because there is a crust of frozen zirconia covering the inside entrance to the frusto-conical bore 78. Next the operator breaks this crust of frozen zirconia over the bore 78 with a very long ramrod supported by a chain (not shown) whereby the operator can stand a long distance away from the pouring spout 77. Then a stream 165 (Figure 7) of molten zirconia flows out of the spout 77 and immediately the operator opens the water valve wider to increase the velocity of the stream of water 170 which, as will be seen in Figure 7, forms a trough.

We have found that a pressure of 65 pounds to the square inch and a flow of 300 gallons a minute gives a satisfactory stream of water 170. However the flow of water required is a function of the flow of molten zirconia and the pressure required is dependent upon the size of the orifice 104 and the flow required. The critical factor, however, is the velocity of the stream because too slow a stream will cause explosions. We have found that the stream of water forming the trough 170 ought to have a velocity of at least 50 feet per second and while there may be no exact upper limit given, 400 feet per second may be taken as a practical upper limit. We prefer to use a stream 170 having a velocity of about 100 feet per second.

Coincidentally with turning on the water full force the operator quickly tilts the furnace so as to draw the molten zirconia from a point well down in the furnace shell 18 because the purest material is well below the top of the bath. The molten zirconia is quenched by a high velocity stream of water 170 and is formed into solid particles of around No. 6 grit size and finer. The zirconia particles thus formed by quenching the molten zirconia with a high velocity stream of water are mostly shell shaped, that is to say many of them are substantially hollow spheres with an opening and many of them are in the shape of a hen's egg shell with an opening somewhere and many of them are in the shape of a football (U. S. style) with an opening somewhere. The hen's egg shell and the football are hollow bodies of revolution sometimes being ellipsoids and sometimes being defined as prolate spheroids, and in some cases the surfaces may for a short distance be paraboloids or hyperboloids or simply slightly irregular. Many of the particles are hollow oblate spheroids having a hole. We shall herein refer to all of them as hollow shells of revolution.

The water and the particles of zirconia are discharged out of the spout 135 into the receiver 136 from which as already explained the water escapes leaving the quenched zirconia therein. When the pouring has continued for sufficient time to lower the level in the furnace to about six inches above the pouring spout 77, the operator returns the shell 18 to level position, replaces the plug 85 and shuts off the water coming into the hose 106. More material is then added to the furnace to continue the fusion and when the molten material has again risen to the desired level, the pouring may be repeated. Thus this furnace can be kept in practically continuous operation.

In a typical operation as above described, it was found that the quenched stabilized zirconia particles were 99% of the following mixture of sizes:

|  | Percent |
| --- | --- |
| Through 8 mesh onto 10 mesh | 4 |
| Through 10 mesh onto 12 mesh | 4 |
| Through 12 mesh onto 16 mesh | 7 |
| Through 16 mesh onto 24 mesh | 28 |
| Through 24 mesh onto 40 mesh | 22 |
| Through 40 mesh onto 60 mesh | 18 |
| Through 60 mesh onto 100 mesh | 10 |
| Through 100 mesh | 7 |

We have found that unquenched stabilized zirconia with CaO has a true specific gravity of close to 5.6 and also the quenched stabilized zirconia with CaO has a true specific gravity of close to 5.6. We find that the unquenched stabilized zirconia with CaO has an apparent bulk specific gravity of around 3.5. We further find that the quenched stabilized zirconia with CaO has an apparent bulk specific gravity of around 1.8. Bricks made of unquenched stabilized zirconia with CaO have an apparent specific gravity of around 4.0. Bricks made of quenched stabilized zirconia with CaO have an apparent specific gravity of around 2.4 to 3.0.

It has long been known that zirconium oxide is highly refractory and it has been known that its melting point is around 2700° C. However it was found that it made an unsatisfactory refractory product because at a particular temperature there is a sharp volume change in the ordinary zirconium oxide to wit, the baddeleyite of monoclinic crystal form. The zirconia of this invention, however, which crystallizes predominantly in the cubic system does not have such a sharp volume change at any temperature and consequently is superior for the manufacture of refractory shapes and articles and thus full advantage may be taken of the high melting point of this oxide. In the manufacture of bricks and other articles out of the material of this invention we frequently mix a small amount of the monoclinic or unstabilized zirconium oxide with our stabilized zirconium oxide because a mixture has a lower temperature coefficient of expansion without the striking volume change that the pure or nearly pure monoclinic variety of baddeleyite has. However we do not recommend the use of more than 20% of the unstabilized zirconium oxide in admixture with the stabilized zirconium oxide.

Having thus produced the refractory material in the above grit sizes, we can make bricks, tubes, crucibles, batts, combustion boats, combustion chambers, burner ports and many other articles by the following procedure: a quantity of quenched stabilized zirconium oxide in accordance with this invention with or without some unstabilized zirconia which may or may not be quenched and up to 20% is wet with a suitable organic liquid such as a solution of dextrine, placed in a mold to produce the desired shape and pressed under a pressure which should not be too high as otherwise the hollow particles of the quenched material will be crushed, which pressure, on the low side, may be 100 pounds to the square inch and higher and on the high side may be 5000 pounds to the square inch and lower. If less than 100 pounds to the square inch pressure is used the sintering will not form satisfactory bricks. If more than 5000 pounds to the square inch is used, the hollow shells of revolution will be broken and hence there is no advantage in using the quenched material if pressures more than 5000 pounds to the square inch are going to be used. With pressures of 5000 pounds to the square inch the bricks or other articles have an apparent specific gravity of close to 4.0. With pressures of 3000 pounds to the square inch the bricks or other articles will have an apparent specific gravity of around 3.0. With pressures of 1000 pounds to the square inch the bricks or other articles will have an apparent specific gravity of around 2.4. The best bricks and other articles are in the range of apparent specific gravities between 2.4 and 3.0.

After pressing the pressed article is removed from the mold, dried, and then sintered in a suitable kiln at a combination of temperature and time which for the particular article represents a heat treatment of about pyrometric cone 35. However, we have found it advantageous sometimes to fire the articles even higher than cone 35; for example, we have given articles according to this invention heat treatments right up to cone 42 with success. The practical range of heat treatments according to this invention for the manufacture of sintered articles is from pyrometric cone 16 to pyrometric cone 42.

It has long been known that zirconia is highly refractory and for that reason it has not hitherto been considered possible to quench it. If molten zirconia were poured into a pool of water the resulting explosion would have serious consequences. By quenching molten zirconia as hereinbefore described hollow shells of revolution are produced and also fragments of irregular shape and these particles can be used as loose refractory material which has a low bulk specific gravity ranging from about 1.7 to 2.0. For good results this material should be 97% zirconia plus calcium oxide or purer, but it need not contain any calcium oxide or other stabilizing agent. Bricks or other refractory articles according to this invention should be at least 97% zirconium oxide plus calcium oxide but of this only 80% on the whole need be stabilized zirconium oxide. These bricks according to this invention should contain sufficient quenched zirconium oxide to bring the apparent specific gravity of the bricks within the limits previously stated. In any case there may be up to 3% impurities but it is possible to make better than 99% pure zirconium oxide with calcium oxide and naturally the purer forms are preferred. The amount of calcium oxide in the stabilized zirconia should be from 3% to 6% of the amount of $ZrO_2$ in the ore, and since little $ZrO_2$ is lost during the furnacing operation, this can be stated as 3% to 6% calcium oxide on the $ZrO_2$ in the stabilized zirconium oxide which makes up 80% of the brick or other article. In the stabilized zirconium oxide per se the calcium oxide is in solid solution in the zirconium oxide. In the product of the electric furnacing operation producing the stabilized zirconia with lime in solid solution and also in the bricks or other articles made from that product, with or without some monoclinic zirconia added, the crystals are predominantly cubic, that is better than 50% of all the crystals are cubic.

To make the above statement clearer, a brick or other article should contain from 3% to 6% of CaO on the total $ZrO_2$ in the article, and such brick or other article should be better than 50% cubic counting not only the material therein which resulted from the fusion with lime but also the added monoclinic $ZrO_2$ some of which may become stabilized during the sintering of the article.

By reason of all the air spaces in the hollow shells of revolution and otherwise the bricks and other articles according to this invention are very good heat insulators, that is to say their thermal conductivity is very poor. Since the material is also very refractory and since as hereinbefore described it is resistant to heat shock and will not readily spall or crack and has long life, very valuable refractory articles can be made out of this quenched zirconium oxide some of which is stabilized. It will also be seen that the furnacing method produces grit for the manufacture of refractory articles without the laborious step of crushing a heavy pig with sledge hammers. Thus the process of the invention is labor saving.

It will thus be seen that there has been provided by this invention an art, a composition of matter and an article in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense. While bricks and other articles are mostly stabilized zirconium oxide, as above described, according to this invention, the grain itself, for use as a loose refractory material may, according to the invention, be entirely unstabilized zirconium oxide provided it has the physical characteristics indicated which may be produced by the quenching process described.

We claim:

1. A process for the manufacture of quenched stabilized zirconia comprising fusing in an electric arc furnace an ore containing $ZrO_2$ together with a quantity of carbon which is two-thirds of the theoretical quantity of carbon required completely to reduce the silica plus 100% of the theoretical quantity required to reduce all the other oxides (except zirconia) to metal with up to 40% excess over the total of these quantities and together with an amount of iron that is enough to make with two-thirds of the silicon a ferrosilicon having an iron content of 75% to 85% minus the amount of iron obtained by the reduction of the iron oxide in the ore to iron, and together with a stabilizing agent consisting of calcium oxide, the quantity of stabilizing agent being from 3% to 6% of the amount of $ZrO_2$ in the ore, pouring such liquid fusion while molten into a stream of water having a velocity of at least 50 feet per second.

2. The process according to claim 1 in which the stream is a trough.

3. A particle in the form of a hollow shell of revolution having an opening therein breaking the otherwise perfect shell, said particle being made of stabilized zirconium oxide characterized by having a crystal structure predominantly in the cubic system and made by fusing in an electric arc furnace an ore containing $ZrO_2$ together with a quantity of carbon which is two-thirds of the theoretical quantity of carbon required completely to reduce the silica plus 100% of the theoretical quantity required to reduce all the other oxides (except zirconia) to metal with up to 40% excess over the total of these quantities and together with an amount of iron that is enough to make with two-thirds of the silicon a ferrosilicon having an iron content of 75% to 85% minus the amount of iron obtained by the reduction of the iron oxide in the ore to iron, and together with a stabilizing agent consisting of calcium oxide, the quantity of stabilizing agent being from 3% to 6% of the amount of $ZrO_2$ in the ore, and pouring such liquid fusion while molten into a stream of water having a velocity of at least 50 feet per second.

4. A particle according to claim 3 in which the hollow shell is substantially a sphere.

5. A particle according to claim 3 in which the hollow shell is substantially a prolate spheroid.

6. A refractory article consisting of at least 97% pure self-bonded crystalline zirconium oxide with calcium oxide, of which at least 80% is zirconium oxide stabilized with calcium oxide, and crystallized from a fusion of these oxides, the crystals being predominantly cubic and those of the stabilized zirconium oxide containing calcium oxide in solid solution, the amount of calcium oxide in the article being from 3% to 6% of the total amount of $ZrO_2$ in the article, at least 80% of the refractory article being made of hollow bodies of revolution with an opening therein thereby reducing the specific gravity of the article to from 2.4 to 3.0.

ARCHIBALD H. BALLARD.
DOUGLAS W. MARSHALL.

References Cited in the file of this patent

UNITED STATES PATENTS

| Number | Name | Date |
|---|---|---|
| 1,427,816 | Hutchins | Sept. 5, 1922 |
| 2,072,889 | Kinzie et al. | Mar. 9, 1937 |
| 2,194,426 | Kinzie et al. | Mar. 19, 1940 |
| 2,206,287 | Kinzie et al. | July 2, 1940 |
| 2,270,527 | Kinzie et al. | Jan. 20, 1942 |
| 2,535,526 | Ballard et al. | Dec. 26, 1950 |